United States Patent Office 3,359,231
Patented Dec. 19, 1967

3,359,231
SYNTHETIC TRANS-1,4 POLYMERS OF CONJUGATED DIOLEFINS WITH IMPROVED HARDENING RATE PROPERTIES
Eric George Kent, Sarnia, Ontario, Canada, assignor to Polymer Corporation Limited, Sarnia, Ontario, Canada, a body corporate and politic
No Drawing. Filed Oct. 18, 1965, Ser. No. 497,448
Claims priority, application Canada, Feb. 6, 1965, 922,679
6 Claims. (Cl. 260—41.5)

ABSTRACT OF THE DISCLOSURE

Process of producing shaped articles, such as golf ball covers, from synthetic crystalline trans-1,4 polymer of a conjugated diolefin is improved by dispersing 1–10 parts by weight per 100 parts of the above polymer of a siliceous material having a particle size of not greater than 0.1 micron.

---

This invention relates to polymeric compositions and, in particular, to compositions based on synthetic trans-1,4 polymers of conjugated diolefins.

Natural trans-1,4 polymer in the form of either balata or gutta percha, has found considerable application in the manufacture of, for example, golf ball covers, belting, adhesives and submarine cables. However, the existence of a high demand for natural trans-1,4 polymer, especially for golf balls, has tended to outstrip the quantity of this material available to the market.

While it would, perhaps, be reasonable to expect synthetic trans-1,4 polymer of conjugated diolefin to bridge the gap between supply and demand in respect of the natural material, not all of the synthetic trans-1,4 polymers possess the property of hardening with sufficient speed compared with natural balata. This deficiency, for example, in the production of golf balls, would necessitate increasing the normal time expended on moulding the covers, with consequent loss in efficiency, or running the risk of the covers sticking to the surface of the mound on attempting to remove them prematurely.

It is an object of the invention to improve the hardening rate properties of synthetic trans-1,4 polymers of conjugated diolefins.

According to the present invention, a polymeric composition having an improved hardening rate comprises a synthetic trans-1,4 polymer of a conjugated diolefin having dispersed therein a siliceous material possessing an average particle size not greater than 0.1 micron.

The invention also includes an improved process of producing a shaped article of a composition containing a trans-1,4 polymer of a conjugated diolefin, which comprises heating the composition above the melting point of said polymer, whereby the composition softens, shaping to a predetermined shape, and hardening by cooling, the improvement comprising dispersing 1–20 parts per 100 parts by weight of the trans-1,4 polymer of a siliceous material having an average particle size of not greater than 0.1 micron, said improvement resulting in an increased rate of hardening.

While the particle size of the siliceous material has a critical upper limit, there is no such restriction on the minuteness of the particles which can be utilized. However, in normal practice, it has been found convenient to use compounds having an average particle size less than about 0.05 micron and usually from about 0.01 to 0.03 micron.

The amount of siliceous material which is incorporated in the polymer can vary but does not usually exceed 20 percent, being suitably from 1 to 10 percent and preferably from 2 to 5 percent, based on the weight of the synthetic trans-1,4 polymer.

The siliceous material which is admixed with the synthetic trans-1,4 polymer may vary in composition and may be prepared by a number of known methods. The material is a fine, fluffy powder containing at least about 50 percent by weight silicon dioxide, has a surface area of about 10 to 800 square meters per gram, and an average particle size of below 0.1 micron, usually from 0.01 to 0.05 micron. Chemically, these materials are various forms of silica including hydrated silica, hydrated calcium silicate, pyrogenic or combustion silica, colloidal silica, aluminum silicate and similar materials. They are available under such trademarks as Hi-Sil 233, Cab-O-Sil, Alusil, Microcal, Neosyl, Fransil 251, Ultra Sil VN-3, Silene EF, Wolastonite, Celite and Aerosil. The naturally occurring silicas such as ground sand or quartz or diatomaceous earth are extremely difficult, if even possible, to reduce by mechanical means to sufficiently small particles of satisfactory specific surface area.

The dispersion of a siliceous material of the appropriate particle size in synthetic trans-1,4 polymer leads to a composition which exhibits a significant improvement in hardening rate over the synthetic polymer per se. Moreover, the composition, on being subjected to other physical tests, generally compares favorably with those on the polymer itself and, in some cases, a slight improvement is observed. Furthermore, the hardening rate and tear strength of the polymeric composition compares quite favorably with natural balata.

The synthetic trans-1,4 polymer which can be used according to the present invention is a high molecular weight polymer of an open chain conjugated diolefin containing 4–6 carbon atoms. It is preferred to use trans-1,4 polymer of a conjugated diolefin containing 5 carbon atoms and best results are obtained with trans-1,4 polymer of isoprene. The term "polymer" is understood to include both homopolymer and copolymer of the conjugated diolefin. The copolymer may contain a minor proportion of a comonomer selected from monoolefins such as ethylene, propylene, butene, styrene; diolefins such as those listed above as well as hexadiene-1,4, dicyclopentadiene, and cyclooctadiene. It is preferred to use copolymers containing less than 20 percent of the comonomer units and more than 80 percent of the conjugated diolefin units.

The polymer of the conjugated diolefin used in this invention is stereoregular as indicated by the expression "trans-1,4." It means that the preponderance of the conjugated diolefin monomer units is linked in the trans-1,4 configuration. Accordingly, the polymers must have at least 85 percent of the diolefin units, and preferably above 90 percent, in the trans-1,4 configuration. The steric regularity of the diolefin monomeric units results in a periodic order along the chain and also leads to an order between the chains in an unstressed polymer at room temperature. This tri-dimensional order is detected by X-ray. The extent to which the polymer is in an ordered, that is, crystalline state may vary from about 5 percent to 60 percent at room temperature as determined by the method described herein below for trans-1,4 polyisoprene. The advantages of this invention, however, are most pronounced in polymers showing a crystallinity level of 15 to 30 percent.

Due to the substantial crystallinity, the trans-1,4 polymer of conjugated diolefin is a thermoplastic rubber, that is, hard at room temperature and rubbery elastic at temperatures above the melting point. It is characterized by the ability to harden, when cooled at temperatures below the melting point, which may vary between 50° C. and 150° C. The rate of hardening may vary considerably as has been mentioned herein above, from a very fast hardening, almost instantaneous, to a very slow one requiring hours to reach a measurable hardness. This invention is concerned primarily with a trans-1,4 polymer of an intermediate hardening rate which, being in the rubbery elastic state, requires not less than 1 minute and not more than 1 hour, and preferably between 5 and 45 minutes, of cooling at room temperature to harden to a measurable degree.

The synthetic polyisoprene which is preferably employed in this invention is a crystalline high molecular weight polymer of isoprene, characterized by having at least 85 percent of the monomeric units in the trans-1,4 configuration. The polyisoprenes benefiting most by this invention are those having between about 90–95 percent trans-1,4 configuration and between about 15–30 percent crystallinity. The methods of producing such polymers are known in the art and thus are not the subject of this invention. The structural analysis of the polymers may be determined by infra-red spectroscopy. The crystallinity is determined by measuring areas under the crystalline peaks and amorphous peaks in the X-ray diffraction curve, and expressing the crystallinity as the ratio of the crystalline area to the sum of the crystalline and amorphous areas. The hardness and hardening rate are inherently conferred by the regularity of the structure of the trans polymer.

The hardening rate of trans-1,4 polyisoprene was determined using a Wallace micro hardness tester made by H. W. Wallace & Co., Ltd., of Croydon, England. A sample of polymer was conditioned for 10 minutes at 100° C., then cooled at 20° C. for 15 minutes during which time the sample gradually cooled and hardened and the hardness was measured at about two minute intervals. Hardness values expressed in the Standard Degrees Scale (ISO°) are reported in specific examples: (1) the original hardness of cold polymer, (2) hardness of the hot conditioned polymer after 5 minutes of cooling, and (3) hardness after further increments of 5 minutes of cooling. Usually, it is desired to have a polymer which recovers its original hardness in about 10 minutes, but it is not unusual to find trans-1,4 polyisoprene polymers which require a longer time. Tests of tear strength were performed on hot press-molded microtensile sheets using a conventional Instron tester.

In this specification, the following definitions are used to characterize the trans-1,4 polyisoprene polymers: (a) a trans polyisoprene of slow hardening rate is one which, after heating to 100° C. for 10 minutes, returns to within 10 percent of its original hardness in a period of from 15 to 45 minutes at a temperature of 20° C.; (b) a trans polyisoprene of medium hardening rate is one which, after heating to 100° C. for 10 minutes, returns to within 10 percent of its original hardness in a period of from 5 to 15 minutes at a temperature of 20° C.; (c) a trans polyisoprene of fast hardening rates in one which, after heating to 100° C. for 10 minutes, returns to within about 10 percent of its original hardness in a period of 5 minutes and to essentially the original hardness after a period of 10 minutes at a temperature of 20° C. The hardness and hardening rate as used in these definitions are understood to refer to the method of test by the Wallace instrument herein previously described.

The invention will now be illustrated with reference to the following examples, all parts being give by weight:

Example I

By means of a two-roll mill heated to 100° C., five parts and ten parts of Hi-Sil 233, respectively, were dispersed into 100 parts of a synthetic trans polyisoprene having a slow hardening rate and a percent trans value of 90. Hi-Sil 233 is a commercially available precipitated siliceous oxide in hydrated form, comprising about 89 percent $SiO_2$, and having an average particle size of 0.022 micron. This experiment was repeated using Cab-O-Sil in place of Hi-Sil 233. Cab-O-Sil is a commercially avilable pyrogenic silica comprising about 99 percent $SiO_2$, and having an average particle size of 0.015 to 0.020 micron. A control sample of polyisoprene, into which no silica additive had been dispersed, was also mixed in the same manner. The four resulting compositons, together with the control containing no silica additive, were subjected to the determination of hardening rate and tear strength, the data from which appear in Table I.

TABLE I

| Wallace Hardness | Siliceous Additive | | | | |
|---|---|---|---|---|---|
| | None [1] | Hi-Sil 233 | | Cab-O-Sil | |
| | Amount (parts/100 parts of polyisoprene) | | | | |
| | Nil | 5 | 10 | 5 | 10 |
| Original | 94 | 96 | 95 | 95 | 94 |
| After 5 minutes of cooling | [2] NM | [2] NM | [2] NM | [2] NM | 30 |
| After 10 minutes of cooling | [2] NM | 60 | 82 | 63 | 32 |
| After 15 minutes of cooling | 60 | 84 | 95 | 82 | 92 |
| Tear Strength (lbs./inch) | 100 | 150 | 165 | 120 | 130 |

[1] Control composition.
[2] NM = not measurable.

Example II

Five and ten parts of each of Hi-Sil 233, Cab-O-Sil and Silene EF were dispersed as in Example I, into 100 parts of a synthetic trans polyisoprene having a medium rate of hardening and having a trans configuration of 95 percent. Silene EF is a commercially available calcium silicate having an average particle size of 0.03 micron. A control having no silicon-containing additive was also used.

Also prepared were a composition containing 5 parts of Hi-Sil 233 and a composition containing 5 parts Silene EF dispersed in a synthetic trans polyisoprene of normal hardening rate and of trans configuration greater than 95 percent. Again a control sample free of silica additive was used for comparison.

All compositions were evaluated for hardening rate and tear strength, with the data being listed in Table II.

TABLE II

| | Trans Polyisoprene of Normal Hardening Rate | | | Trans Polyisoprene of Medium Hardening Rate | | | | | | |
|---|---|---|---|---|---|---|---|---|---|---|
| | No Additive | 5 Parts Hi-Sil 233 | 5 Parts Silene EF | No Additive | Hi-Sil 233 | | Cab-O-Sil | | Silene EF | |
| | | | | | 5 Parts | 10 Parts | 5 Parts | 10 Parts | 5 Parts | 10 Parts |
| Original Wallace Hardness | 98 | 99 | 99 | 98 | 98 | 98 | 98 | 97 | 98 | 99 |
| Wallace Hardness after 5 minutes from heating | 90 | 97 | 98 | 61 | 95 | 98 | 98 | 97 | 96 | 97 |
| Wallace Hardness after 10 minutes from heating | 98 | 99 | 99 | 96 | 98 | 98 | 98 | 97 | 98 | 99 |
| Tear Strength, pounds per inch | 115 | 130 | 120 | 115 | 125 | 125 | 140 | 125 | 125 | 130 |

The results shown in Tables I and II show that the addition to a synthetic trans polyisoprene of a siliceous material, such as silica or a silicate, of small particle size and containing at least 50 percent $SiO_2$, results in a significant improvement in the hardening rate and tear strength.

*Example III*

The compositions of Examples I and II containing 5 and 10 parts, respectively, of siliceous materials were used in the production of golf balls. The moulded outer covers of golf balls made from the above compositions satisfactorily hardened within less than 15 minutes, when cooled at room temperature. They were removed from the mould without any damage to their surface. When stored for 24 hours at room temperature, the covers retained their shape.

I claim:

1. A process of producing a shaped article of a composition containing a synthetic crystalline trans-1,4 polymer of a conjugated diolefin which comprises heating the composition above the melting point of said polymer, whereby the composition softens, shaping to a predetermined shape, and hardening by cooling, whereby the rate of hardening is increased by dispersing 1–10 parts per 100 parts by weight of the trans-1,4 polymer of a siliceous material having an average particle size from 0.01 to 0.05 micron.

2. The process according to claim 1, in which the trans-1,4 polymer is a polymer of isoprene containing at least 85 percent of the isoprene monomeric units in the trans-1,4 configuration.

3. The process according to claim 1, in which the siliceous material is selected from the group consisting of hydrated silicas, pyrogenic silicas, calcium silicates and aluminum silicates.

4. A process of producing a shaped article of a composition containing a synthetic crystalline trans-1,4 polymer of isoprene containing at least 85 percent of the isoprene monomeric units in the trans-1,4 configuration, which comprises heating the composition above the melting point of said polymer, whereby the composition softens, shaping to a predetermined shape, and hardening by cooling, whereby the rate of hardening is increased by dispursing 1–10 parts per 100 parts of the trans-1,4 polymer of a siliceous material selected from the group consisting of hydrated silicas, pyrogenic silicas, calcium silicates and aluminum silicates, said material having an average particle size of 0.01 to 0.05 micron.

5. The process according to claim 4 in which the siliceous material is used in an amount of 2–5 parts per 100 parts of the trans-1,4 polymer of isoprene.

6. The process according to claim 4 in which the polymer is a homopolymer of isoprene containing at least 85 percent of the monomeric units in the tanrs-1,4 configuration.

References Cited

UNITED STATES PATENTS 3,223,694  12/1965  Farrar _____ 260—94.3

OTHER REFERENCES

Morton: Introduction to Rubber Technology, Reinhold Publishing Corp., New York (1959), pages 232–243, TS 1890 M66.

MORRIS LIEBMAN, *Primary Examiner.*

S. L. FOX, *Assistant Examiner.*